(12) United States Patent
Yui et al.

(10) Patent No.: US 11,431,004 B2
(45) Date of Patent: Aug. 30, 2022

(54) METHOD FOR SEPARATING A GASKET MAIN BODY FROM A CARRIER FILM

(71) Applicant: NOK CORPORATION, Tokyo (JP)

(72) Inventors: Hajime Yui, Fujisawa (JP); Kenichi Oba, Fujisawa (JP); Takuro Nishimura, Fujisawa (JP)

(73) Assignee: NOK CORPORATION

( * ) Notice: Subject to any disclaimer, the term of this patent is extended or adjusted under 35 U.S.C. 154(b) by 953 days.

(21) Appl. No.: 16/303,754

(22) PCT Filed: Mar. 30, 2017

(86) PCT No.: PCT/JP2017/013174
§ 371 (c)(1),
(2) Date: Nov. 21, 2018

(87) PCT Pub. No.: WO2017/203832
PCT Pub. Date: Nov. 30, 2017

(65) Prior Publication Data
US 2020/0321635 A1    Oct. 8, 2020

(30) Foreign Application Priority Data

May 24, 2016    (JP) .............................. JP2016-103490

(51) Int. Cl.
*H01M 8/0286*    (2016.01)
*F16J 15/10*    (2006.01)
(Continued)

(52) U.S. Cl.
CPC ......... *H01M 8/0286* (2013.01); *F16J 15/102* (2013.01); *H01M 8/0273* (2013.01);
(Continued)

(58) Field of Classification Search
CPC .. H01M 8/0286; H01M 8/0273; F16J 15/102; F16J 15/025; F16J 15/106; B29L 2031/265
See application file for complete search history.

(56) References Cited

U.S. PATENT DOCUMENTS

| 5,564,714 A | 10/1996 | Katsuno et al. |
| 2006/0127732 A1* | 6/2006 | Yoshida .................. H01M 8/00 29/623.1 |
| 2013/0149635 A1* | 6/2013 | Hood .................. H01M 8/1004 29/730 |

FOREIGN PATENT DOCUMENTS

| CN | 1496458 A | 5/2004 |
| CN | 1655034 A | 8/2005 |
(Continued)

OTHER PUBLICATIONS

JP,54-159552 MT (Year: 1979).*
(Continued)

*Primary Examiner* — Alexander Usyatinsky
(74) *Attorney, Agent, or Firm* — Harness, Dickey & Pierce, P.L.C.

(57) ABSTRACT

A method of suctioning a gasket main body with a suction jig to separate the gasket main body from a carrier film. The method separates a gasket main body from a carrier film in a gasket including a combination of the gasket main body and the carrier film adhered thereto, where a suction jig is used to separate the carrier film and the gasket main body; the suction jig includes a suction surface at a position facing the carrier film; the suction surface being formed with a suction groove having a shape that corresponds with a planar shape of the gasket main body, the suction groove being formed with a plurality of suction paths across the entire periphery; and the gasket main body is suctioned to the suction groove with the suction force from the suction paths in the suction jig and separated from the carrier film.

3 Claims, 14 Drawing Sheets

(51) Int. Cl.
*H01M 8/0273* (2016.01)
*B29L 31/26* (2006.01)
*F16J 15/02* (2006.01)

(52) U.S. Cl.
CPC ........ *B29L 2031/265* (2013.01); *F16J 15/025* (2013.01); *F16J 15/106* (2013.01)

(56) References Cited

FOREIGN PATENT DOCUMENTS

| | | |
|---|---|---|
| CN | 104428931 A | 3/2015 |
| EP | 2 874 218 A1 | 5/2015 |
| GB | 2 164 018 A | 3/1986 |
| JP | 54-159552 * | 12/1979 |
| JP | S54-159552 A | 12/1979 |
| JP | H01-097531 A | 4/1989 |
| JP | 06-050431 * | 2/1994 |
| JP | H06-050431 A | 2/1994 |
| JP | 2005-24084 * | 1/2005 |
| JP | 2005-024084 A | 1/2005 |
| JP | 2006-164881 A | 6/2006 |
| JP | 2014-060133 A | 4/2014 |

OTHER PUBLICATIONS

JP,06-050431 MT (Year: 1994).*
JP 2005-24084 MT (Year: 2005).*
Extended European Search Report for Application No. EP 17 80 2433 dated May 31, 2019 (5 pages).

* cited by examiner

METHOD FOR SEPARATING A GASKET MAIN BODY FROM A CARRIER FILM

CROSS REFERENCE TO RELATED APPLICATIONS

This application is a U.S. National Stage application of International Application No. PCT/JP2017/013174 filed on Mar. 30, 2017 and published in Japanese as WO 2017/203832 on Nov. 30, 2017 and claims priority to Japanese Patent Application No. 2016-103490 filed on May 24, 2016. The entire disclosures of the above applications are incorporated by reference herein.

BACKGROUND

Technical Field

The present invention relates to gaskets in a seal technique, and more specifically to a handling method of a gasket with a carrier film including a combination of a gasket main body including a rubber-like elastic body and a carrier film that holds the gasket main body. The gasket according to the present invention is, for example, used as a gasket for a fuel battery or as a general gasket for other applications.

Related Art

The gasket for the fuel battery includes gaskets of various configurations such as a rubber only gasket including a rubber-like elastic body, a separator integrated gasket in which the gasket including the rubber-like elastic body is integrally molded to a separator, a GDL integrated gasket in which the gasket including the rubber-like elastic body is integrally molded to a GDL (Gas Diffusive Layer), and the like.

Such gaskets each has characteristics, but the rubber only gasket that satisfies a request for lower cost is being given attention as such request is becoming stronger in recent years. The rubber only gasket shown in, for example, FIG. 13 is known.

The rubber only gasket (hereinafter also simply referred to as gasket) 510 shown in FIG. 13A overall has a planar shape (flat plate shape), where an outer peripheral seal portion 521 that seals the periphery of a reaction surface of a fuel battery over the entire periphery is arranged to have a rectangular frame shape in plan view, and a manifold seal portion 522 is integrally arranged at both ends in a longitudinal direction of the outer peripheral seal portion to seal the periphery of each manifold. A cross-sectional shape of the gasket is a circular cross-sectional shape as shown in FIG. 13B.

However, the rubber only gasket 510 described above still can be improved in the following points.

In other words, since the gasket 510 generally has the cross-sectional shape (wire diameter) set small to about 1 mm to a few mm, twist tends to easily occur in the gasket at the time of conveyance and stacking, and handling operability (handling property) thereof is not satisfactory.

Thus, as shown in FIG. 14A and FIG. 14B, a gasket with a carrier film (hereinafter also simply referred to as gasket) 510 including a combination of a gasket main body 520 including a rubber-like elastic body, and a carrier film 530 that holds the gasket main body 520 by being adhered to the gasket main body 520 has been proposed. In such gasket with the carrier film 510, the gasket main body 520 including the rubber-like elastic body is held by the carrier film 530 having a higher strength, and thus twist is less likely to occur, and the handling operability can be enhanced.

The gasket with the carrier film 510 is manufactured through the following method. In other words, a planar carrier film 530 cut to a planar shape of a predetermined size is prepared, and such carrier film 530 is mold clamped while being sandwiched with a die (not shown). The die includes a combination of an upper die and a lower die, and one cavity (not shown) is correspondingly provided in both dies. Next, a molding material for molding the gasket main body 520 is filled into the cavity and heated to mold the gasket main body 520. When the molding material is filled into the cavity, one part of the plane of the carrier film 530 is pressed against an inner surface of the cavity of the lower die by a molding material filling pressure and deformed (plastic deformation) to a shape that lies along the inner surface of the cavity, thus forming a gasket holding unit 531. After the gasket main body is molded, the die is opened. The gasket main body 520 is thus in a state of being adhered by the carrier film 530, and transportation, storage and the like of the product are carried out in such adhered state. When attaching the gasket 510 to the separator and the like of the fuel battery, the gasket main body 520 is separated from the carrier film 530 and such gasket main body 520 is attached to the separator, and the like.

When separating the gasket main body 520 from the carrier film 530, a method of suctioning the gasket main body 520 with a pad or a suction jig (not shown) is considered.

However, as the pad or the suction jig needs to ensure a constant suction area to suction a work, suction leakage may occur and suction/separation of the work may become difficult in the gasket main body 520 in which the cross-sectional area (wire diameter) is set small to about 1 mm to a few mm.

In light of the foregoing, it is an object of the present invention to provide a gasket handling method capable of separating a gasket main body from a carrier film by suctioning a gasket main body with a suction jig.

SUMMARY OF THE INVENTION

As a means for effectively solving the technical problem described above, a gasket handling method of the present invention relates to a gasket handling method of separating a gasket main body from a carrier film in a gasket including a combination of the gasket main body including a rubber-like elastic body and the carrier film that holds the gasket main body by being adhered to the gasket main body. The method comprises using a suction jig when separating the gasket main body from the carrier film, wherein the suction jig includes a suction surface at a position facing the carrier film; the suction surface is formed with a suction groove having a shape that corresponds with a planar shape of the gasket main body, the suction groove being formed with a plurality of suction paths at a required interval over the entire periphery; and separating the gasket main body from the carrier film by fixing the carrier film, and suctioning one surface in a thickness direction of the gasket main body to the suction groove with a suction force from the suction paths in the suction jig.

A seal lip may be formed on the one surface in the thickness direction of the gasket main body; and the suction groove may have a shape that corresponds to a cross-sectional shape of the seal lip.

A seal lip may be formed on the one surface in the thickness direction of the gasket main body; and the suction groove may accommodate the seal lip and come into close contact with the gasket main body at a peripheral edge part.

Furthermore, an elastically deformable porous material having air permeability may be attached to the suction jig over the entire periphery of the suction groove to close the suction path; and the one surface in the thickness direction of the gasket main body may be suctioned to the porous material by the suction force from the suction paths formed in the suction jig.

Effect of the Invention

According to the gasket handling method of the configuration described above, the gasket main body can be suctioned to the suction groove in the suction jig, and thus the gasket main body can be separated from the carrier film.

BRIEF DESCRIPTION OF THE DRAWINGS

FIG. 1 is a view showing a gasket according to first to third embodiments of the present invention, where

FIG. 13 is a view showing a gasket according to a conventional art, where FIG. 14 is a view showing a gasket according to a reference example, where

DETAILED DESCRIPTION OF THE PREFERRED EMBODIMENTS

Hereinafter, a gasket 10 according to a first embodiment will be described in detail based on the drawings.

Figure 1A:
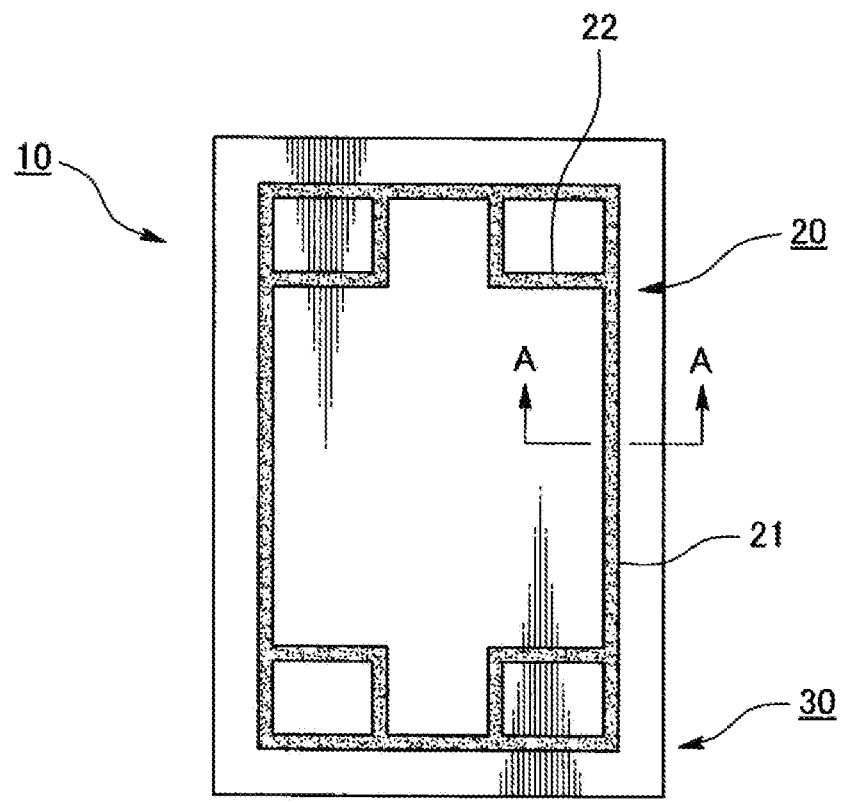
FIG. 1A is a plan view and FIG. 1B is a cross-sectional view taken along A-A of FIG. 1A.
Figure 1B:
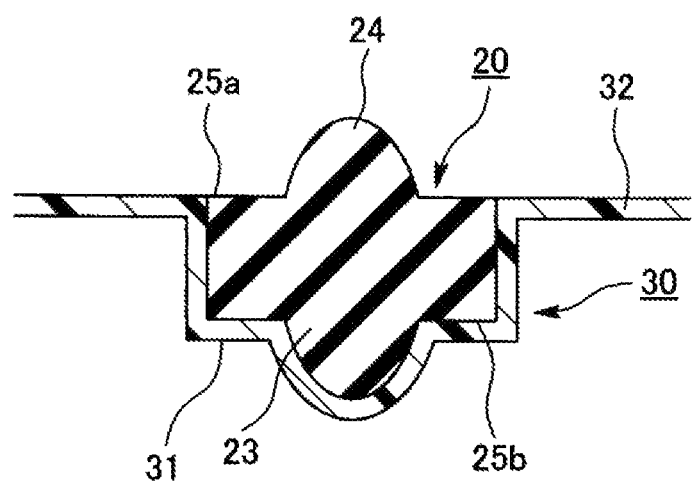
Figure 2:
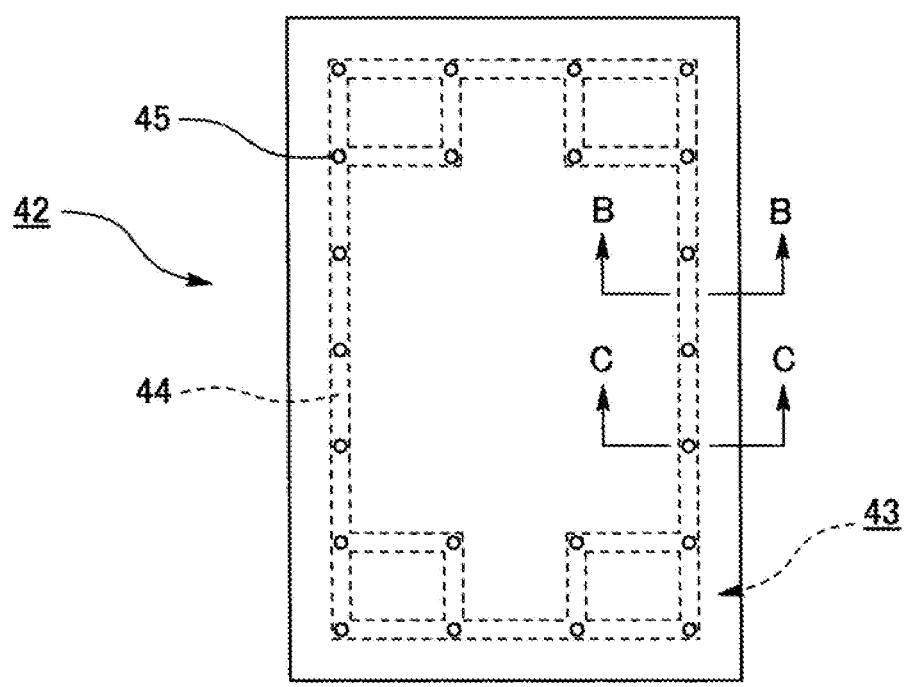
FIG. 2 is a plan view of a suction jig according to the first to third embodiments of the present invention.
Figure 3A:
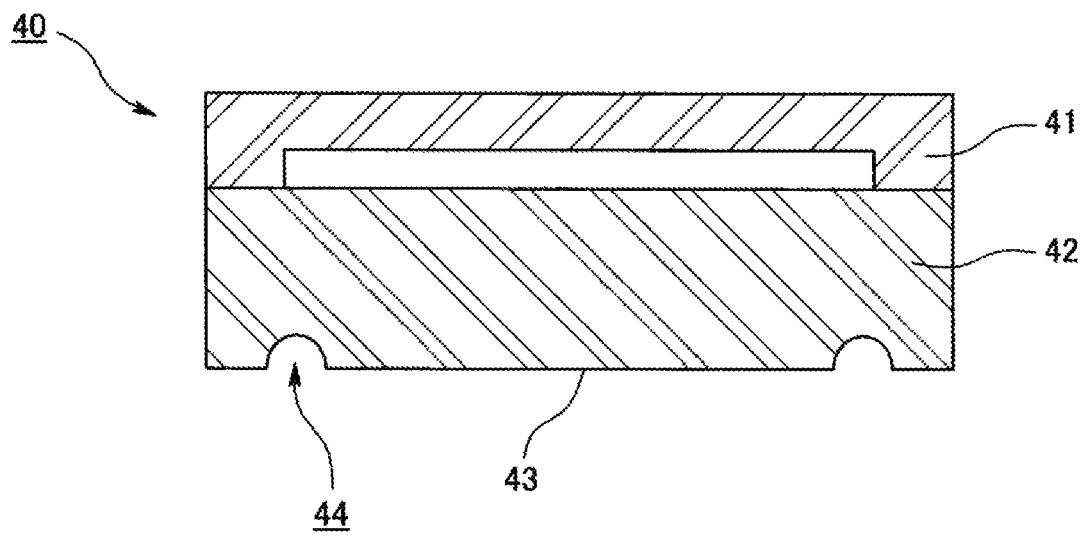
FIG. 3A is a cross-sectional view taken along B-B of FIG. 2.
Figure 3B:
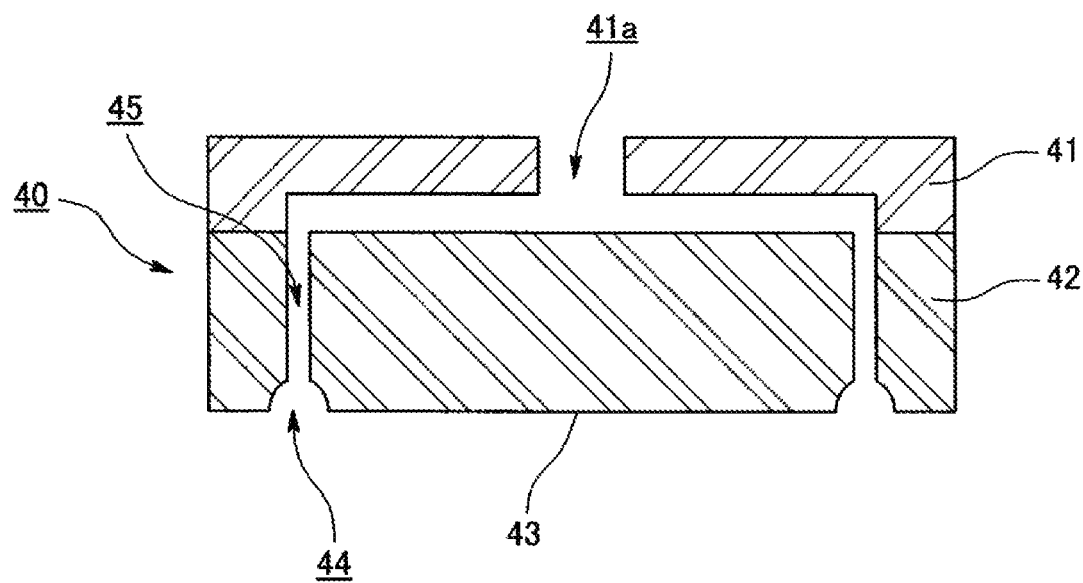
FIG. 3B is a cross-sectional view taken along C-C of FIG. 2.

FIG. 1 is a view showing a gasket 10 according to first to third embodiments of the present invention, where FIG. 1A is a plan view and FIG. 1B is a cross-sectional view taken along A-A of FIG. 1A. FIG. 2 is a plan view of a suction jig 40 according to the first to third embodiments of the present invention, FIG. 3A is a cross-sectional view taken along B-B of FIG. 2, and FIG. 3B is a cross-sectional view taken along C-C of FIG. 2.

As shown in FIG. 1, the gasket 10 according to the present embodiment is made from a required rubber-like elastic body (e.g., VMQ, PIB, EPDM, FKM, etc.), and is formed by a combination of a gasket main body 20 assembled onto a plane of a separator for a fuel battery, which is one type of plate, and a carrier film 30 consisting of a resin film adhered in a strippable manner to the gasket main body 20.

As shown in FIG. 1A, the gasket main body 20 is molded to a planar shape (flat plate shape) as a whole, and has an outer peripheral seal portion 21, which seals a periphery of a reaction surface of the fuel battery over an entire periphery, arranged to a rectangular frame shape in plan view, and also has a manifold seal portion 22 integrally arranged at both ends in a longitudinal direction of the outer peripheral seal portion 21 to partition the reaction surface of the fuel battery and each manifold portion. As shown in FIG. 1B, the gasket main body 20 is formed with a seal base portion 23 having a rectangular cross-section, where a seal lip 24 having a substantially circular arc shaped or a convex shaped cross-section is formed at a middle of one surface 25a in a thickness direction and a middle of another surface 25b in the thickness direction of the seal base portion 23, respectively.

The carrier film 30 consists of a resin film having a rectangular shape in plan view of one size greater than the entire gasket main body 20. A gasket holding unit 31 that holds the gasket main body 20 by being adhered to the gasket main body 20 is arranged and a carrier film piece 32 not adhered to the gasket main body 20 is arranged at one part on the plane of the carrier film 30. Polypropylene film having a thickness of 0.2 mm, for example, is used for such resin film, which film is used by being cut to a predetermined planar shape. Other than the polypropylene, a general resin material such as polyethylene, polystyrene and the like can be used for the resin film. The thickness of the film depends on the wire diameter and the cross-sectional shape of the gasket main body 20, but is preferably about 0.1 mm to 0.3 mm.

A method for manufacturing the gasket 10 according to the present embodiment will now be described. In manufacturing, a die (rubber molding die) that injection molds the gasket main body 20 including the rubber-like elastic body is used.

First, a planar carrier film 30 cut to a planar shape of a predetermined size is prepared, and such carrier film 30 is mold clamped while being sandwiched with a die (not shown). The die includes a combination of an upper die and a lower die, and one cavity (not shown) is correspondingly provided in both dies. Next, a molding material for molding the gasket main body 20 is filled into the cavity and heated to mold the gasket main body 20. When the molding material is filled into the cavity, one part of the plane of the carrier film 30 is pressed against an inner surface of the cavity of the lower die by a molding material filling pressure and deformed (plastic deformation) to a shape that lies along the inner surface of the cavity, thus forming a gasket holding unit 31. After the gasket main body 20 is molded, the die is opened, and the gasket main body 20 and the carrier film 30 are simultaneously taken out from the die.

Thus, that gasket 10 has the gasket main body 20 adhered to the carrier film 30, so that the product is conveyed, stored, and like in the adhered state.

Figure 4:
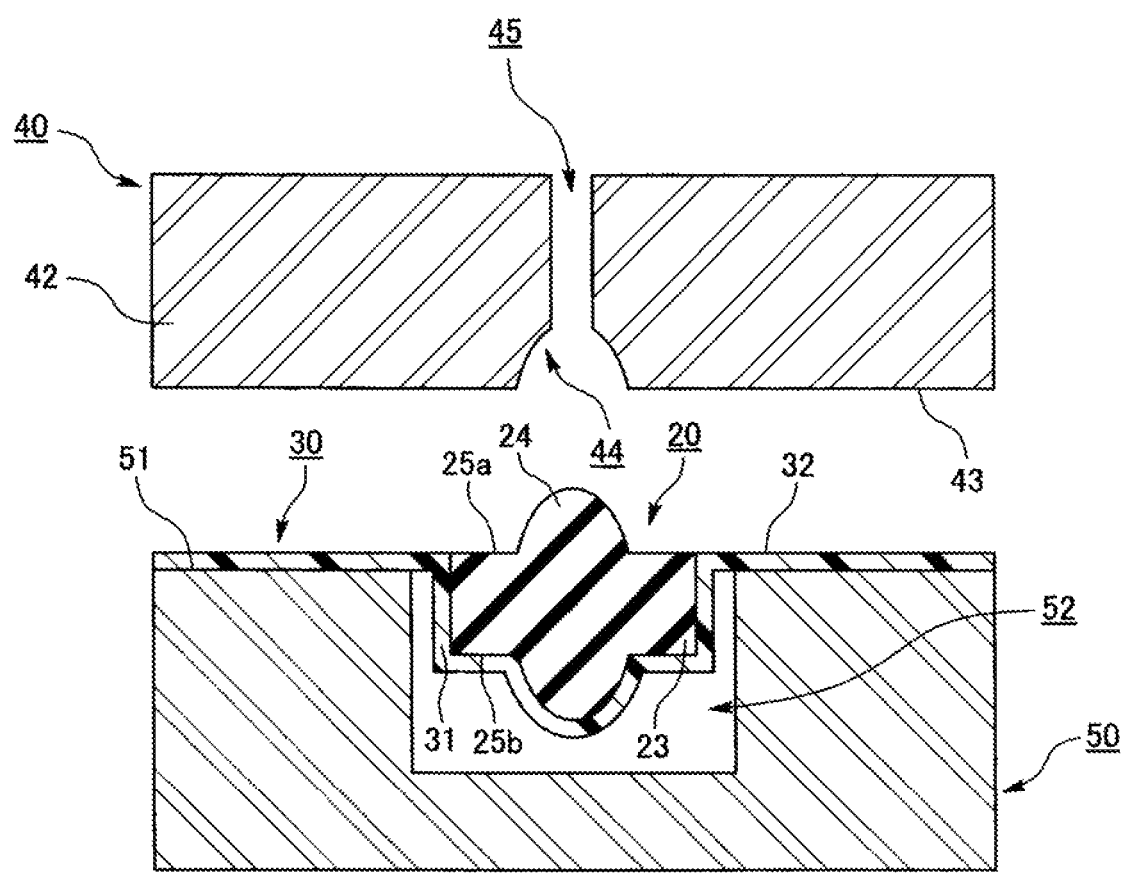
FIG. 4 is a cross-sectional view of the main part showing a state before suctioning a gasket main body according to the first embodiment of the present invention.

Next, a handling method of the gasket 10 according to the present embodiment will be described. As shown in FIG. 3 and FIG. 4, the gasket 10 according to the present embodiment is separated to a fixing jig 50 that fixes the carrier film piece 32, and a suction jig 40 that separates the gasket main body 20 from the carrier film 30 by suctioning the gasket main body 20.

The fixing jig 50 includes a fixing surface 51 for fixing the carrier film 30, where an escape groove 52 arranged in a recessed manner in the fixing surface 51 to escape the seal lip 24 of the gasket main body 20 when the carrier film piece 32 is fixed may be formed.

The suction jig 40 is made of metal or resin, and is attached to a vacuum generating device and the like (not shown), the suction jig including a seating 41 connected to an intake pipe and the like (not shown) and formed with a suction hole 41a that communicates with a suction path 45, to be described later, and a suction plate 42 attached to a lower surface of the seating 41.

A suction surface 43 is formed at a lower end of the suction plate 42. The entire suction surface is formed with a suction groove 44 having a cross-sectional shape equivalent to the cross-sectional shape of the seal lip 24, as shown in FIG. 3A, FIG. 3B, and FIG. 4 and a planar shape corresponding with a planar shape of the gasket main body 20 as shown in FIG. 3. Furthermore, as shown in FIG. 3, the suction groove 44 is formed with the suction path 45, which is formed in plurals at a required interval over the entire periphery of the suction groove 44. When the vacuum generating device, and the like is operated, suction force is generated at the suction path 45, and the seal lip 24 on one surface 25a side in the thickness direction of the gasket main body 20 is suctioned by such suction force.

Figure 5:
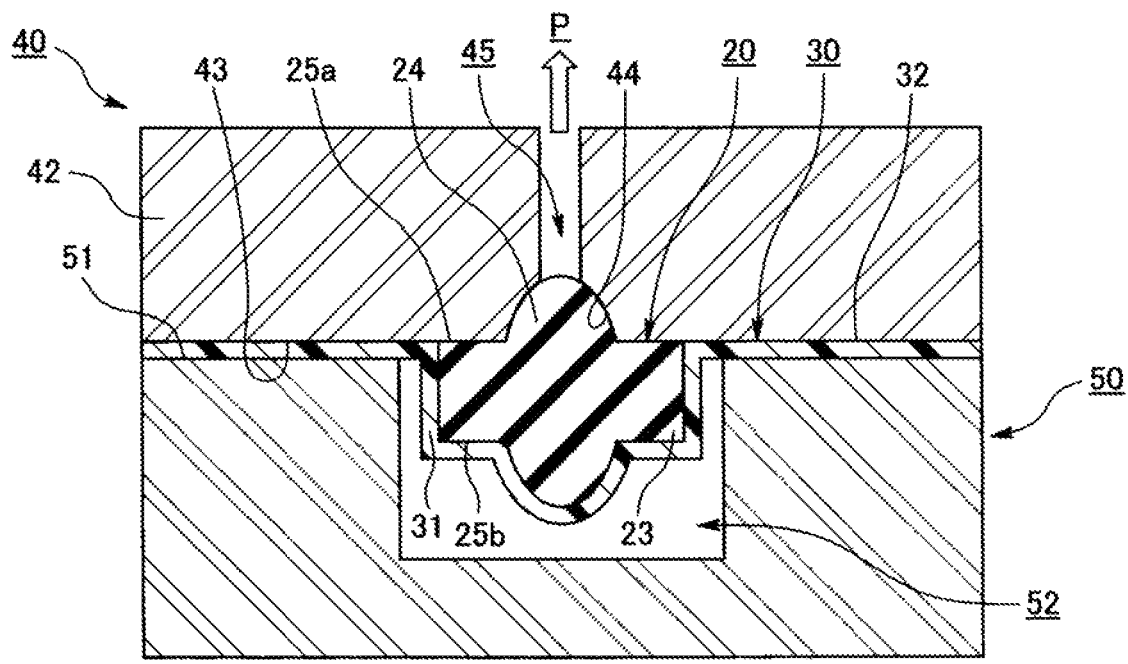
FIG. 5 is a cross-sectional view of the main part showing a state while suctioning the gasket main body according to the first embodiment of the present invention.
Figure 6:
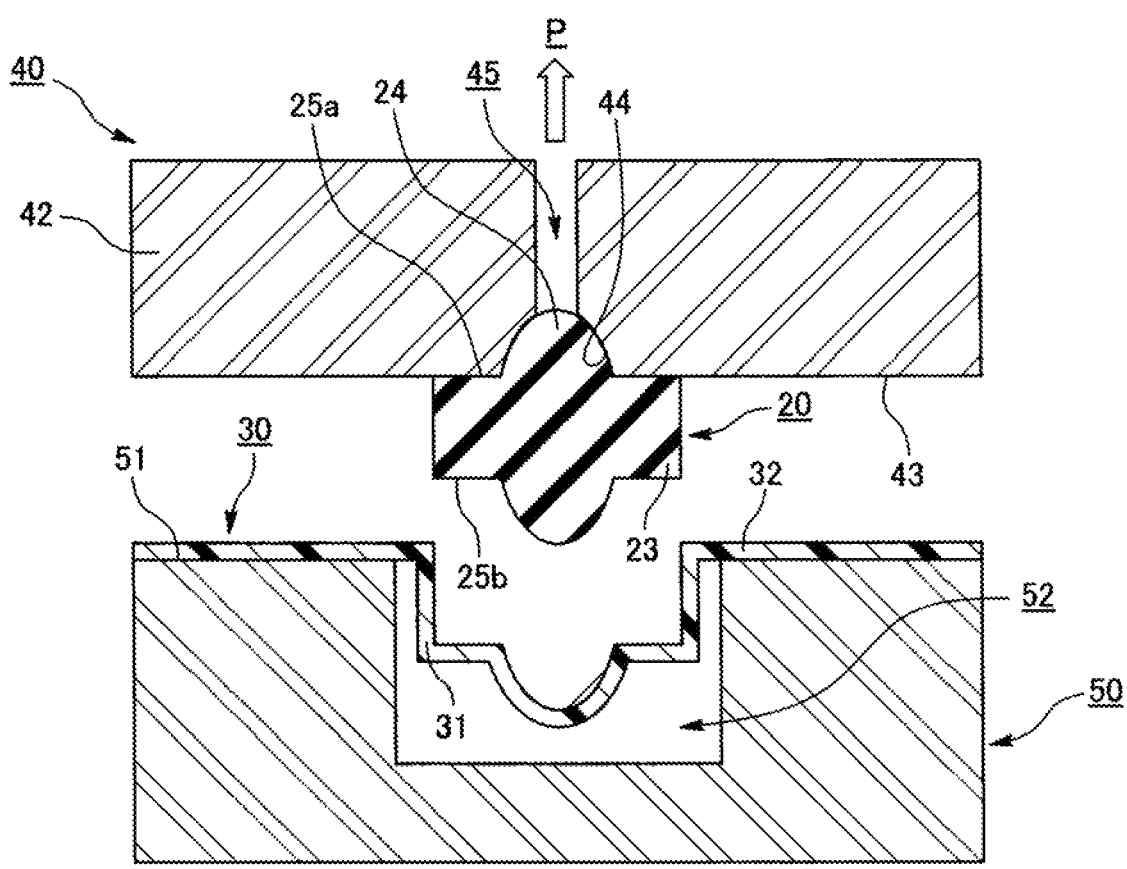
FIG. 6 is a cross-sectional view of the main part showing a state in which the gasket main body is separated from a carrier film according to the first embodiment of the present invention.

Now, a procedure for separating the gasket main body 20 from the carrier film 30 will be described. FIG. 4 is a cross-sectional view of the main part showing a state before suctioning the gasket main body 20 according to the first embodiment of the present invention, FIG. 5 is a cross-sectional view of the main part showing a state while suctioning the gasket main body 20 according to the first embodiment of the present invention, and FIG. 6 is a cross-sectional view of the main part showing a state in which the gasket main body 20 is separated from the carrier film 30 according to the first embodiment of the present invention.

First, as shown in FIG. 4, one part of the carrier film piece 32 is fixed to the fixing surface 51 of the fixing jig 50, and the gasket main body 20 and the gasket holding unit 31 are arranged at the middle of the escape groove 52 of the fixing jig 50. Next, as shown in FIG. 5, the fixing jig 50 and the suction jig 40 are brought close to bring the seal lip 24 in the gasket main body 20 into close contact with the suction groove 44. In this case, as the shape of the suction groove 44 and the shape of the seal lip 24 are equivalent shapes, the seal lip 24 is exactly fitted into the suction groove 44 thus closing the suction path 45. The suction path 45 exerts the suction force in a direction of an arrow P, whereby the pressure in the suction path 45 becomes a negative pressure with respect to the outer side of the gasket main body 20 and the seal lip 24 is suctioned to the suction groove 44. Thereafter, as shown in FIG. 6, the fixing jig 50 and the suction jig 40 are separated, so that the gasket main body 20 is separated from the gasket holding unit 31 in the carrier film 30.

Therefore, according to the handling method of the gasket 10 of the present embodiment, even when the cross-sectional shape (wire diameter) of the gasket main body 20 is set small, the gasket main body 20 can be separated from the carrier film 30 as the seal lip 24 of the gasket main body 20 is brought into close contact with and suctioned by the suction groove 44 having a cross-sectional shape equivalent to the cross-sectional shape of the seal lip 24 and a planar shape corresponding with the planar shape of the gasket main body 20.

Figure 7:
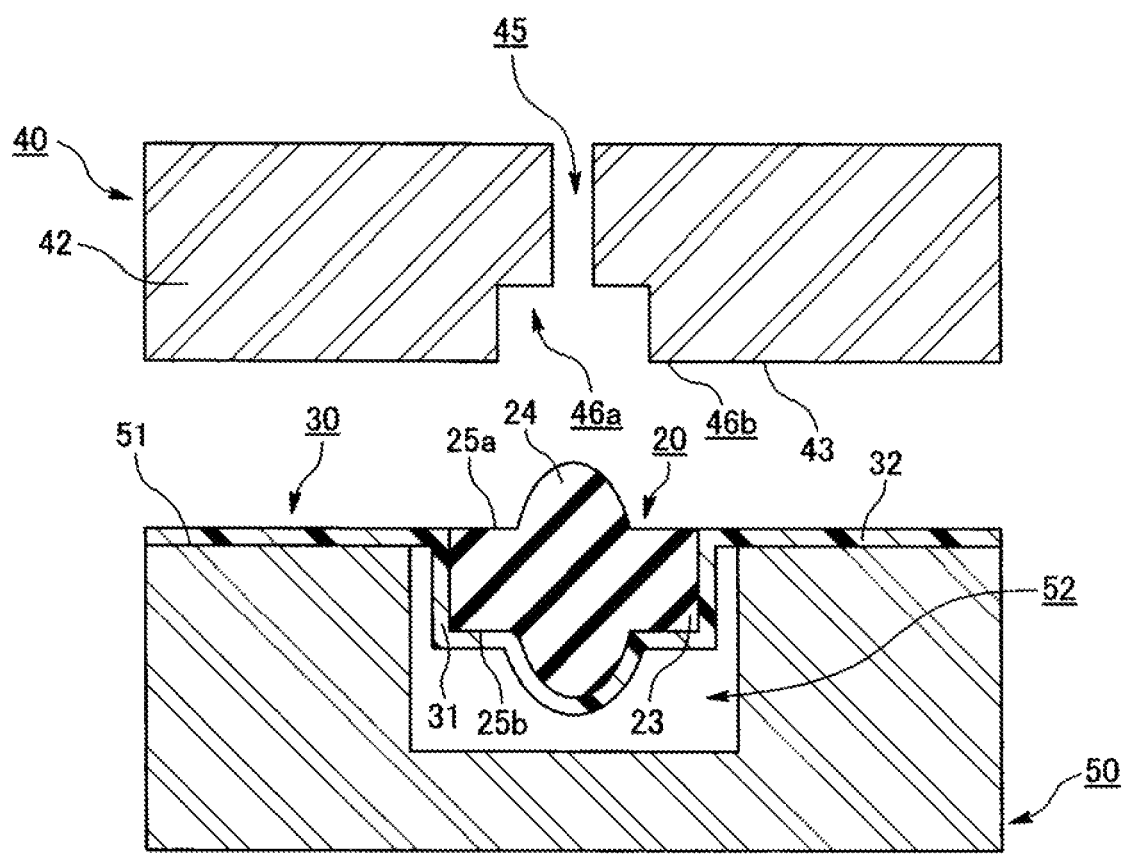
FIG. 7 is a cross-sectional view of the main part showing a state before suctioning a gasket main body according to a second embodiment of the present invention.
Figure 8:
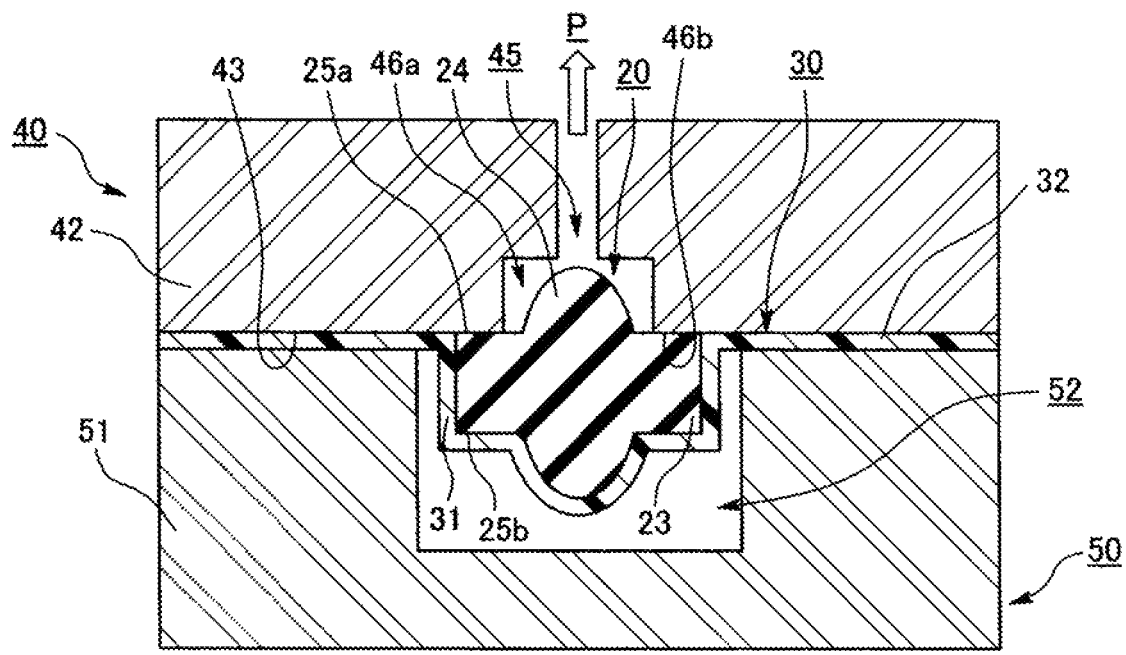
FIG. 8 is a cross-sectional view of the main part showing a state while suctioning of the gasket main body according to the second embodiment of the present invention.
Figure 9:
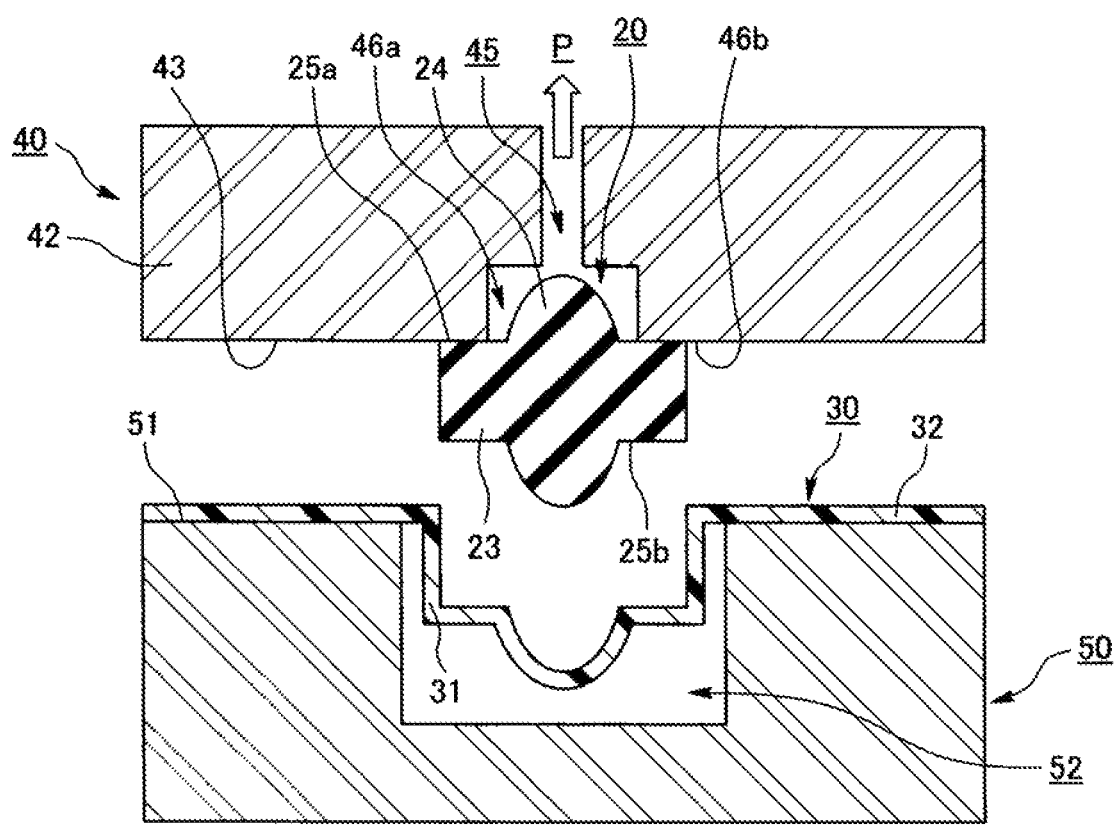
FIG. 9 is a cross-sectional view of the main part showing a state in which the gasket main body is separated from a carrier film according to the second embodiment of the present invention.

Next, the handling method of the gasket 10 according to a second embodiment will be described. FIG. 7 is a cross-sectional view of the main part showing a state before suctioning the gasket main body 20 according to the second embodiment of the present invention, FIG. 8 is a cross-sectional view of the main part showing the state while suctioning the gasket main body 20 according to the second embodiment of the present invention, and FIG. 9 is a cross-sectional view of the main part showing a state in which the gasket main body 20 is separated from the carrier film 30 according to the second embodiment of the present invention.

The handling method of the gasket 10 according to the present embodiment differs from the first embodiment in the configuration of the suction jig 40.

The suction groove formed in the suction jig 40 according to the present embodiment is an accommodating portion 46a arranged in a recessed manner in the suction surface 43, and in the present embodiment, a width of the accommodating portion 46a is set to be larger than the width of the seal lip 24 in the gasket main body 20 and smaller than the width of the seal base portion 23.

Next, a procedure for separating the gasket main body 20 from the carrier film 30 will be described.

First, as shown in FIG. 7, one part of the carrier film piece 32 is fixed to the fixing surface 51 of the fixing jig 50, and the gasket main body 20 and the gasket holding unit 31 are arranged at the middle of the escape groove 52 of the fixing jig 50. Next, as shown in FIG. 8, the fixing jig 50 and the suction jig 40 are brought close to bring one surface 25a in the thickness direction of the gasket main body 20 into close contact with the accommodating portion 46a. In this case, the accommodating portion 46a accommodates the seal lip 24 and comes into close contact with the seal base portion 23 on the one surface 25a side in the thickness direction at a peripheral edge part 46b of the accommodating portion 46a, and thus the gasket main body 20 closes the suction path 45. The suction path 45 exerts the suction force toward the direction of the arrow P so that the pressure inside the suction path 45 becomes a negative pressure with respect to the outer side of the gasket main body 20, and the seal base portion 23 is suctioned to the peripheral edge part 46b of the accommodating portion 46a. Thereafter, as shown in FIG. 9, the fixing jig 50 and the suction jig 40 are separated, so that the gasket main body 20 is separated from the gasket holding unit 31 in the carrier film 30.

Therefore, according to the handling method of the gasket 10 of the present embodiment, as the seal lip 24 is accommodated in the accommodating portion 46a having a recessed shape, and the seal base portion 23 is brought into close contact with and suctioned to the peripheral edge part 46b of the accommodating portion 46a, even when the cross-sectional shape (wire diameter) of the gasket main body 20 is set small, the gasket main body 20 can be separated from the carrier film 30.

Figure 10:
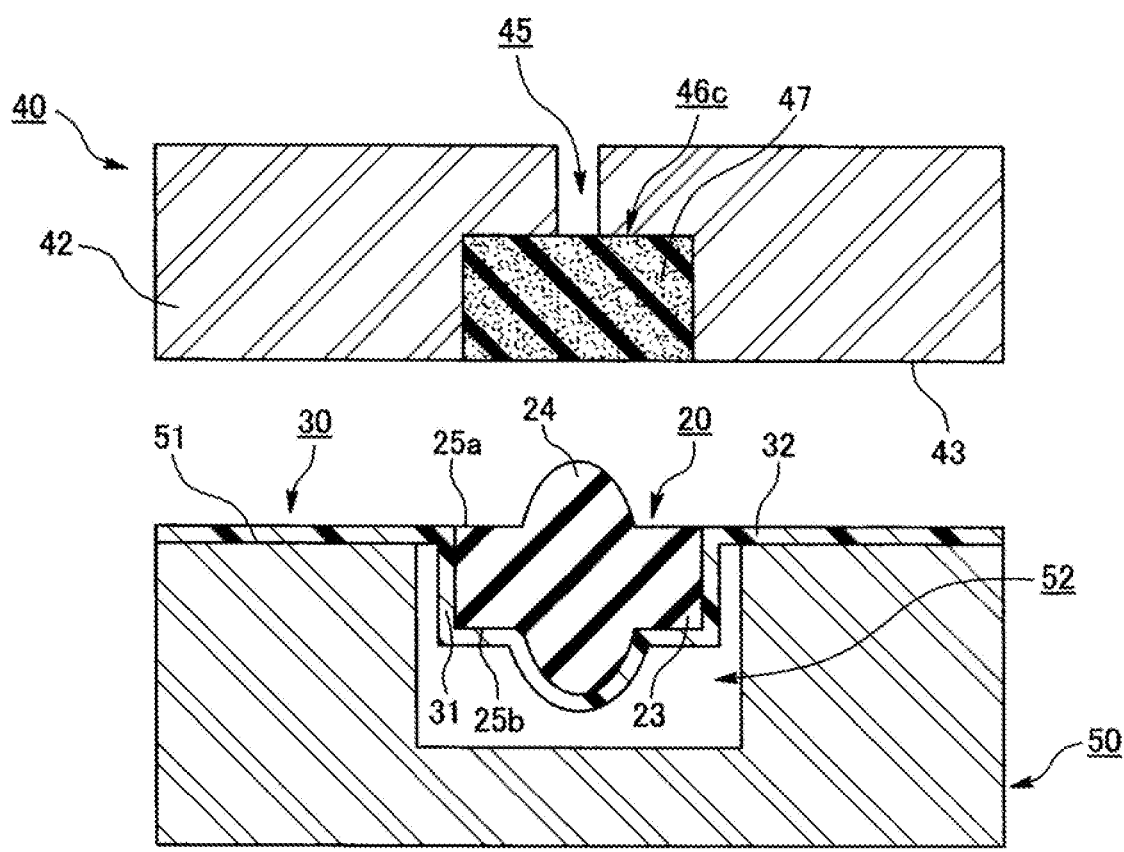
FIG. 10 is a cross-sectional view of the main part showing a state before suctioning a gasket main body according to a third embodiment of the present invention.
Figure 11:
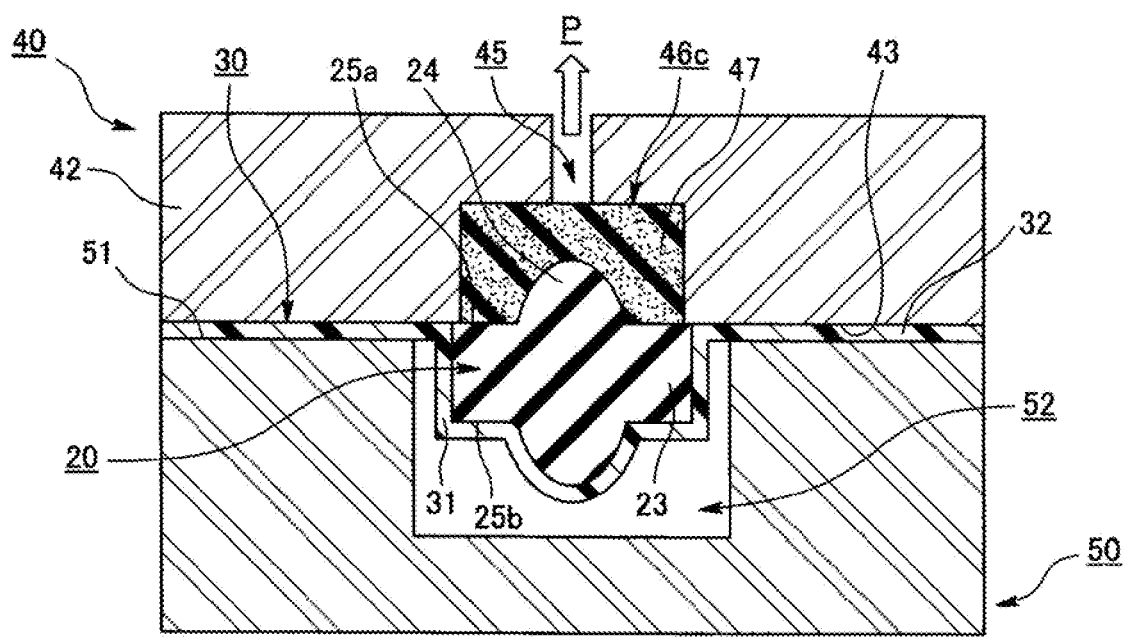
FIG. 11 is a cross-sectional view of the main part showing a state while suctioning of the gasket main body according to the third embodiment of the present invention.
Figure 12:
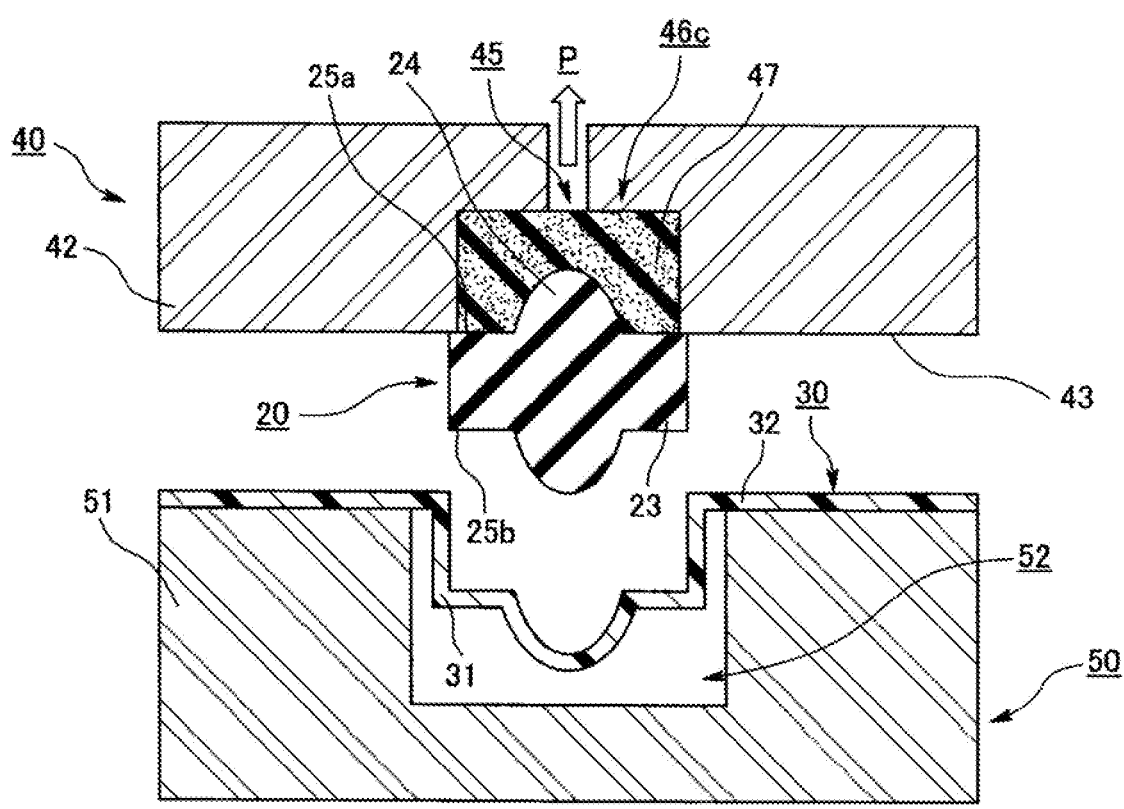
FIG. 12 is a cross-sectional view of the main part showing a state in which the gasket main body is separated from a carrier film according to the third embodiment of the present invention.
Figure 13A:
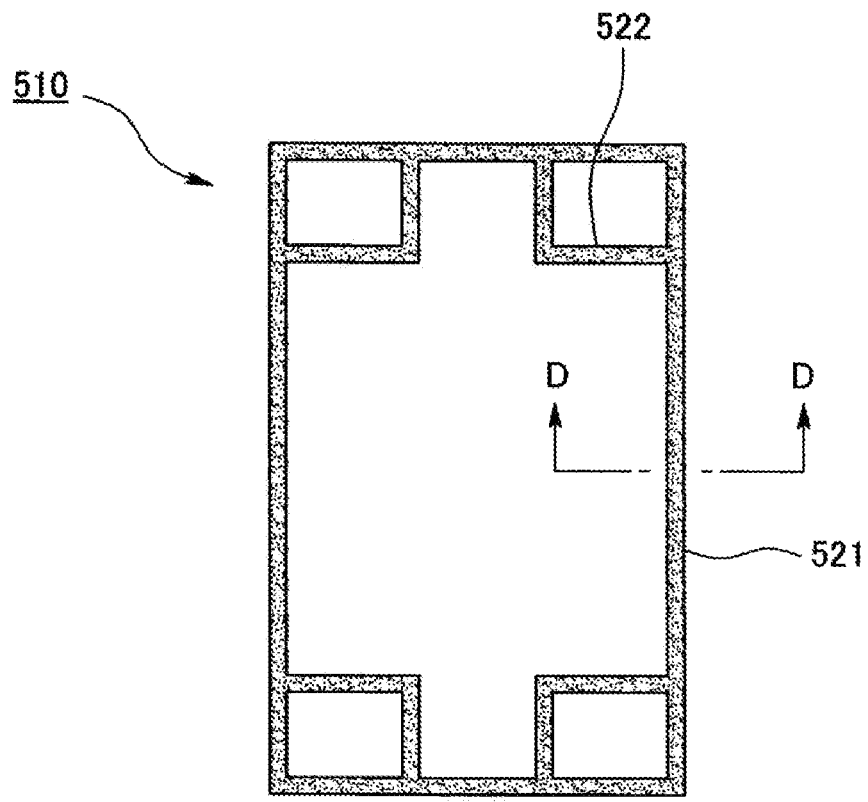
FIG. 13A is a plan view.
Figure 13B:
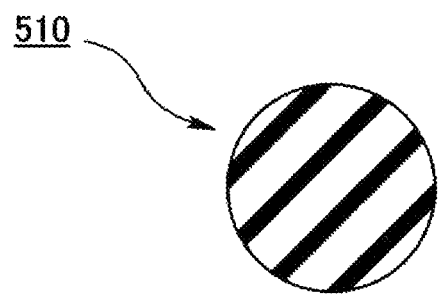
FIG. 13B is a cross-sectional view taken along D-D of FIG. 13A.
Figure 14A:
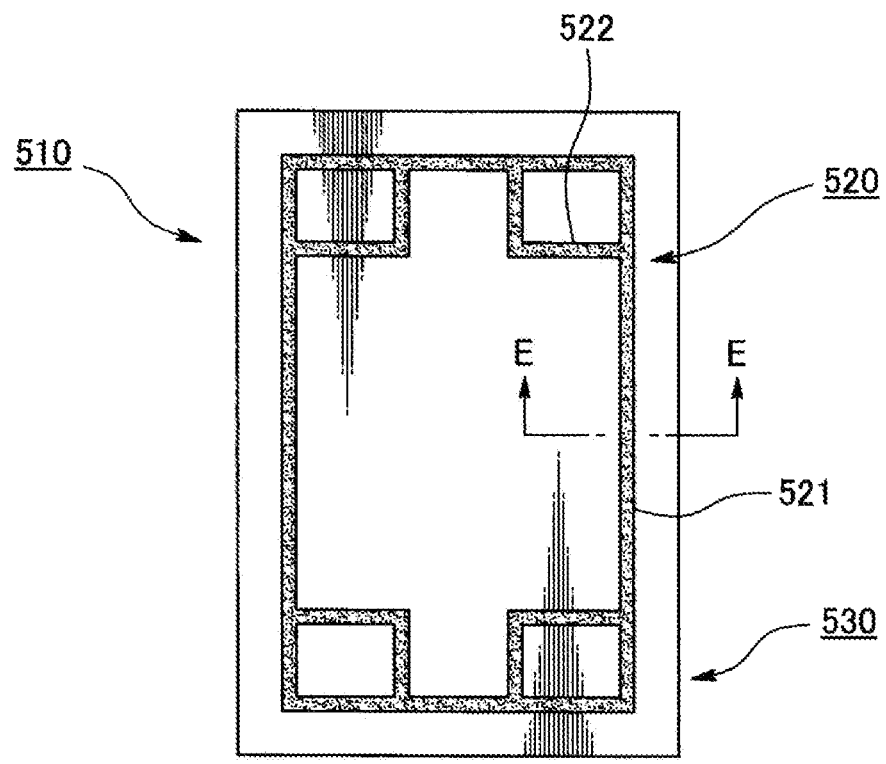
FIG. 14A is a plan view.
Figure 14B:
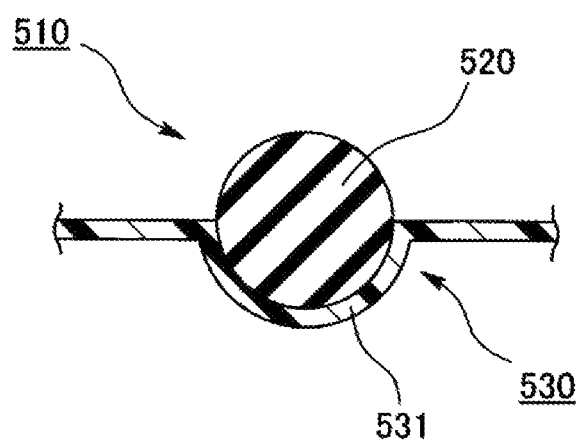
FIG. 14B is a cross-sectional view taken along E-E of FIG. 14A.

Next, a handling method of the gasket 10 according to a third embodiment will be described. FIG. 10 is a cross-sectional view of the main part showing a state before suctioning a gasket main body 20 according to the third embodiment of the present invention; FIG. 11 is a cross-sectional view of the main part showing a state while suctioning the gasket main body 20 according to the third embodiment of the present invention; and FIG. 12 is a cross-sectional view of the main part showing a state in which the gasket main body 20 is separated from a carrier film 30 according to the third embodiment of the present invention.

The handling method of the gasket 10 according to the present embodiment differs from the first and second embodiments in the configuration of the suction jig 40.

The suction groove formed in the suction jig 40 according to the present embodiment is an attachment groove 46c formed in a recessed manner in the suction surface 43, and in the present embodiment, a width of the attachment groove 46c is set to be slightly smaller than the width of the gasket main body 20. Furthermore, the attachment groove 46c is, for example, provided with a porous material 47 made from an air permeable raw material having a lower hardness than the gasket main body 20 such as urethane sponge, and the like, such porous material 47 being fixed to the attachment groove 46c by press fitting, adhering, or sticking.

A procedure for separating the gasket main body 20 from the carrier film 30 will now be described.

First, as shown in FIG. 10, one part of the carrier film piece 32 is fixed to the fixing surface 51 of the fixing jig 50, and the gasket main body 20 and the gasket holding unit 31 are arranged at the middle of the escape groove 52 of the fixing jig 50. Next, as shown in FIG. 11, the fixing jig 50 and the suction jig 40 are brought close, and one surface 25a in the thickness direction of the gasket main body 20 is brought into close contact with the porous material 47. In this case, the porous material 47 having a lower hardness than the gasket main body 20 is pressed against the gasket main body 20 so as to be deformed to the same shape as the seal lip 24. The suction path 45 exerts the suction force toward the direction of the arrow P so that the seal lip 24 is suctioned to the porous material 47. Thereafter, as shown in FIG. 12, the fixing jig 50 and the suction jig 40 are separated, so that the gasket main body 20 is separated from the gasket holding unit 31 in the carrier film 30.

Therefore, according to the handling method of the gasket 10 of the present embodiment, the porous material 47 is brought into close contact with the seal lip 24 so as to be deformed to the same shape as the seal lip 24 and then suctioned to the porous material 47. Thus, even when the cross-sectional shape (wire diameter) of the gasket main body 20 is set small, the gasket main body 20 can be separated from the carrier film 30.

Furthermore, according to the handling method of the gasket 10 of the present embodiment, the porous material 47 described above can be deformed to the same shape as the shape of the seal lip 24. Therefore, even if a slight positional shift occurs between the gasket 10 and the suction jig 40, the gasket main body 20 can be separated from the carrier film 30 regardless of the setting of the width dimension of the gasket main body 20 as the porous material 47 can suction the gasket main body 20. In particular, the gasket 10 according to the present embodiment is effective as the positional shift of the gasket 10 and the suction jig 40 may occur by the deformation of the carrier film 30 and the shift in the width direction of when the suction jig 40 is set on the fixing jig 50.

Furthermore, the gasket main body 20 according to the first, second and third embodiments is separated from the carrier film 30 by being brought into close contact with and suctioned by the suction groove 44 (peripheral edge part 46b of the accommodating portion 46a or porous material 47) formed in the suction jig 40 made of metal or made of resin. The gasket main body 20 according to the first and second embodiments is directly closely attached to and suctioned by the suction jig 40 made of metal, and thus has a possibility of attaching to the suction groove 44 (peripheral edge part 46b of the accommodating portion 46a) after the suction of the suction jig 40. However, according to the handling method of the gasket 10 of the third embodiment, the gasket main body 20 is brought into close contact with the porous material 47 when being separated from the carrier film 30, and thus it is possible to prevent the gasket main body 20 from attaching to the suction jig 40.

The invention claimed is:

1. A method of separating a gasket main body from a carrier film in a gasket including a combination of the gasket main body including a rubber-like elastic body and the carrier film that holds the gasket main body by being adhered to the gasket main body, comprising
    using a suction jig when separating the gasket main body from the carrier film, wherein the suction jig includes a suction surface at a position facing the carrier film; the suction surface is formed with a suction groove having a shape that corresponds with a planar shape of the gasket main body, the suction groove being formed with a plurality of suction paths at a required interval over the entire periphery; and
    separating the gasket main body from the carrier film by fixing the carrier film, and suctioning one surface in a thickness direction of the gasket main body to the suction groove with a suction force from the suction paths in the suction jig,
    wherein an elastically deformable porous material having air permeability is attached to the suction jig over the entire periphery of the suction groove to close the suction path; and
    the one surface in the thickness direction of the gasket main body is suctioned to the porous material by the suction force from the suction path formed in the suction jig.

2. The method according to claim 1, wherein
    a seal lip is formed on the one surface in the thickness direction of the gasket main body; and
    the suction groove has a shape that corresponds to a cross-sectional shape of the seal lip.

3. The method according to claim 1, wherein
    a seal lip is formed on the one surface in the thickness direction of the gasket main body; and
    the suction groove accommodates the seal lip and comes into close contact with the gasket main body at a peripheral edge part.

\* \* \* \* \*